United States Patent
Genden et al.

(10) Patent No.: US 10,635,444 B2
(45) Date of Patent: Apr. 28, 2020

(54) SHARED COMPARE LANES FOR DEPENDENCY WAKE UP IN A PAIR-BASED ISSUE QUEUE

(71) Applicant: INTERNATIONAL BUSINESS MACHINES CORPORATION, Armonk, NY (US)

(72) Inventors: Michael J. Genden, Austin, TX (US); Dung Q. Nguyen, Austin, TX (US); Hung Q. Le, Austin, TX (US); Brian W. Thomto, Austin, TX (US)

(73) Assignee: INTERNATIONAL BUSINSS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 16/024,531

(22) Filed: Jun. 29, 2018

(65) Prior Publication Data

US 2020/0004546 A1    Jan. 2, 2020

(51) Int. Cl.
  *G06F 9/38*        (2018.01)
  *G06F 9/30*        (2018.01)

(52) U.S. Cl.
  CPC ........ *G06F 9/3838* (2013.01); *G06F 9/30021* (2013.01); *G06F 9/3853* (2013.01); *G06F 9/3855* (2013.01); *G06F 9/3857* (2013.01)

(58) Field of Classification Search
  CPC .................................................. G06F 9/3838
  See application file for complete search history.

(56) References Cited

U.S. PATENT DOCUMENTS

| | | |
|---|---|---|
| 6,330,657 B1 | 12/2001 | Col et al. |
| 6,609,189 B1 | 8/2003 | Kuszmaul et al. |
| 9,146,864 B2 | 9/2015 | Reiter et al. |
| 10,387,147 B2 | 8/2019 | Genden et al. |
| 10,394,565 B2 | 8/2019 | Genden et al. |
| 2016/0191034 A1 | 6/2016 | Wagh et al. |
| 2019/0265978 A1 | 8/2019 | Genden et al. |
| 2019/0265979 A1 | 8/2019 | Genden et al. |

OTHER PUBLICATIONS

IBM, "Issue Queue bypass readiness predictor," http://ip.com/IPCOM/000193323; Feb. 18, 2010.

(Continued)

*Primary Examiner* — Farley Abad
(74) *Attorney, Agent, or Firm* — Kunzler Bean & Adamson, PC; Bruce R. Needham (57) ABSTRACT

An apparatus for shared compare lanes for dependency wakeup in a double issue queue includes a source dependency module that determines a number of source dependencies for two instructions to be paired in a row of a double issue queue of a processor. A source dependency includes an unavailable status of a dependent source for data required by the two instructions where the data is produced by another instruction. The apparatus includes a pairing determination module that writes each of the two instructions into a separate row of the double issue queue in response to the source dependency module determining that the number of source dependencies is greater than a source dependency maximum and pairs the two instructions in one row of the double issue queue in response to the source dependency module determining that the number of source dependencies is less than or equal to the source dependency maximum.

20 Claims, 5 Drawing Sheets

(56) References Cited

OTHER PUBLICATIONS

Anonymously, "Fast wakeup of load dependent instructions by a select bypass," http://ip.com/IPCOM/000216900; Apr. 23, 2012.
Ramirez, MA. et al., "Direct Instruction Wakeup for Out-Of-Order Processors," Ministry of Science and Technology of Spain & Research Center for Computing from National Polytechnic Institute, Mexico, http://citeseerx.ist.psu.edu/viewdoc/download?doi=10.1.1.82.132&rep=rep1&type=pdf; 2015.
Ponomarev, DV. et al., "Energy-Efficient Issue Queue Design," IEEE Transactions on Very Large Scale Integration (VLSI) Systems, vol. 11, No. 5, https://pdfs.semanticscholar.org/c341/1eb9925de75bdef95967cb26590bddbddef0.pdf; Oct. 2003.
Anonymously, "Reduced Register Out of Order Age Priority Processor Instruction Issue Queue," http://ip.com/IPCOM/000231835; Oct. 8, 2013.

SHARED COMPARE LANES FOR DEPENDENCY WAKE UP IN A PAIR-BASED ISSUE QUEUE

BACKGROUND

The subject matter disclosed herein relates to queuing of instructions in a processor and more particularly relates to shared compare lanes for dependency wake up in a pair-based issue queue.

A processor or core of a processor often include multiple execution slices that enable parallel processing of commands. The commands are compiled into instructions and a dispatcher sends instructions to an execution slice for processing. The instructions are processed by a mapper that tracks operations and data of an instruction and places the instructions in an issue queue, which verifies operands and other data inputs are available before execution of the instructions. In some cases, the mapper places instructions in a double issue queue where instructions can be paired in a row, which often is more efficient than a single-wide issue queue. While performance is enhanced by tracking all source dependencies for paired instructions, cost and complexity are increased.

SUMMARY

An apparatus for shared compare lanes for dependency wake up in a pair-based issue queue is disclosed. A computer-implemented method and a processor also perform the functions of the apparatus. According to an embodiment of the present invention, the apparatus includes a source dependency module that determines a number of source dependencies for two instructions intended to be paired in a row of a double issue queue of a processor. A source dependency includes an unavailable status of a dependent source for data required by the two instructions where the data is produced by another instruction. The apparatus includes a pairing determination module that writes each of the two instructions into a separate row of the double issue queue in response to the source dependency module determining that the number of source dependencies is greater than a source dependency maximum and that pairs the two instructions in one row of the double issue queue in response to the source dependency module determining that the number of source dependencies is less than or equal to the source dependency maximum.

A computer-implemented method for shared compare lanes for dependency wake up in a pair-based issue queue includes determining a number of source dependencies for two instructions intended to be paired in a row of a double issue queue of a processor. A source dependency includes an unavailable status of a dependent source for data required by the two instructions where the data is produced by another instruction. The computer-implemented method includes writing each of the two instructions into a separate row of the double issue queue in response to determining that the number of source dependencies is greater than a source dependency maximum and pairing the two instructions in one row of the double issue queue in response to determining that the number of source dependencies is less than or equal to the source dependency maximum.

A processor for shared compare lanes for dependency wake up in a pair-based issue queue includes a double issue queue and issue queue logic. The issue que logic includes a source dependency module that determines a number of source dependencies for two instructions intended to be paired in a row of the double issue queue. A source dependency includes an unavailable status of a dependent source for data required by the two instructions where the data is produced by another instruction. The issue queue logic includes a pairing determination module that writes each of the two instructions into a separate row of the double issue queue in response to the source dependency module determining that the number of source dependencies is greater than a source dependency maximum and that pairs the two instructions in one row of the double issue queue in response to the source dependency module determining that the number of source dependencies is less than or equal to the source dependency maximum.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. The modules or portions of modules need not be physically located together, but may comprise disparate components in different locations which, when joined logically together, comprise the module and achieve the stated purpose for the module.

One skilled in the relevant art will recognize that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

An apparatus for shared compare lanes for dependency wake up in a pair-based issue queue is disclosed. A computer-implemented method and a processor also perform the functions of the apparatus. According to an embodiment of the present invention, the apparatus includes a source dependency module that determines a number of source dependencies for two instructions intended to be paired in a row of a double issue queue of a processor. A source dependency includes an unavailable status of a dependent source for data required by the two instructions where the data is produced by another instruction. The apparatus includes a pairing determination module that writes each of the two instructions into a separate row of the double issue queue in response to the source dependency module determining that the number of source dependencies is greater than a source dependency maximum and that pairs the two instructions in one row of the double issue queue in response to the source dependency module determining that the number of source dependencies is less than or equal to the source dependency maximum.

In some embodiments, the source dependency maximum is equal to a number of dependency trackers available to the double issue queue. The dependency trackers each track a source dependency of paired instructions in a row in the double issue queue. In other embodiments, the apparatus includes a number of dependency trackers equal to the source dependency maximum, where each dependency tracker determines when data is available from a dependent source. In other embodiments, the apparatus includes a dependency order module that orders dependency tracking data corresponding to dependent sources in locations in a row of the double issue queue in response to the pairing determination module paring the two instructions in the row of the double issue queue.

In other embodiments, the apparatus includes an execution unit that executes an instruction in the double issue queue in response to the dependency trackers determining that data is available from each dependent source of the instruction. In other embodiments, each dependency tracker sets a wake bit in the double issue queue in response to determining that data from a dependent source monitored by the dependency tracker is available. The execution unit executes the instruction in response to each wake bit being set of the instruction. In other embodiments, a dependency tracker includes a comparator that compares a dependent source tag with a result data tag. The dependent source tag is generated in response to a mapper determining that a source dependency exists for the dependent source. A result data tag includes a tag paired with data placed in a data register file when an operation of the dependent source is completed.

In some embodiments, the pairing determination module creates a single tag for two instructions paired in the double issue queue and creates a separate tag for each of two instructions placed in separate rows of the double issue queue. In other embodiments, the apparatus includes a pairing compatibility module that determines pairing compatibility of the two instructions prior to the pairing determination module pairing the two instructions. The pairing compatibility module determines pairing compatibility based on criteria other than a number of source dependencies. In other embodiments, the source dependency maximum is equal to or greater than a maximum number of source dependencies of an unpaired instruction and less than twice the maximum number of source dependencies of an unpaired instruction. In other embodiments, the maximum number of source dependencies for an unpaired instruction is three.

A computer-implemented method for shared compare lanes for dependency wake up in a pair-based issue queue includes determining a number of source dependencies for two instructions intended to be paired in a row of a double issue queue of a processor. A source dependency includes an unavailable status of a dependent source for data required by the two instructions where the data is produced by another instruction. The computer-implemented method includes writing each of the two instructions into a separate row of the double issue queue in response to determining that the number of source dependencies is greater than a source dependency maximum and pairing the two instructions in one row of the double issue queue in response to determining that the number of source dependencies is less than or equal to the source dependency maximum.

In some embodiments, the source dependency maximum is equal to a number of dependency trackers available to the double issue queue. The dependency trackers each track a source dependency of paired instructions in a row in the double issue queue. In other embodiments, the computer-implemented method includes determining, using a dependency tracker and for each dependent source, when data is available from a dependent source. In other embodiments, the computer-implemented method includes ordering dependency tracking data corresponding to dependent sources in locations in a row of the double issue queue in response to paring the two instructions in the row of the double issue queue. In other embodiments, the computer-implemented method includes executing an instruction in the double issue queue in response to the dependency trackers determining that data is available from each dependent source. In other embodiments, the computer-implemented method includes creating a single tag for each of two instructions paired in the double issue queue and creating a separate tag for two instructions placed in separate rows of the double issue queue. In other embodiments, the computer-implemented method includes determining pairing compatibility of the two instructions prior to pairing the two instructions, where determining pairing compatibility is based on criteria other than a number of source dependencies.

A processor for shared compare lanes for dependency wake up in a pair-based issue queue includes a double issue queue and issue queue logic. The issue que logic includes a source dependency module that determines a number of source dependencies for two instructions intended to be paired in a row of the double issue queue. A source dependency includes an unavailable status of a dependent source for data required by the two instructions where the data is produced by another instruction. The issue queue logic includes a pairing determination module that writes each of the two instructions into a separate row of the double issue queue in response to the source dependency module determining that the number of source dependencies is greater than a source dependency maximum and that pairs the two instructions in one row of the double issue queue in response to the source dependency module determining that the number of source dependencies is less than or equal to the source dependency maximum.

In some embodiments, the processor includes a number of dependency trackers equal to the source dependency maximum, where each dependency tracker determines when data is available from a dependent source. The processor, in some embodiments, includes a dependency order module that orders dependency tracking data corresponding to dependent sources in locations in a row of the double issue queue in response to the pairing determination module paring the two instructions in the row of the double issue queue. The processor, in some embodiments, includes an execution unit that executes an instruction in the double issue queue in response to the dependency trackers determining that data is available from each dependent source of the instruction.

Figure 1:
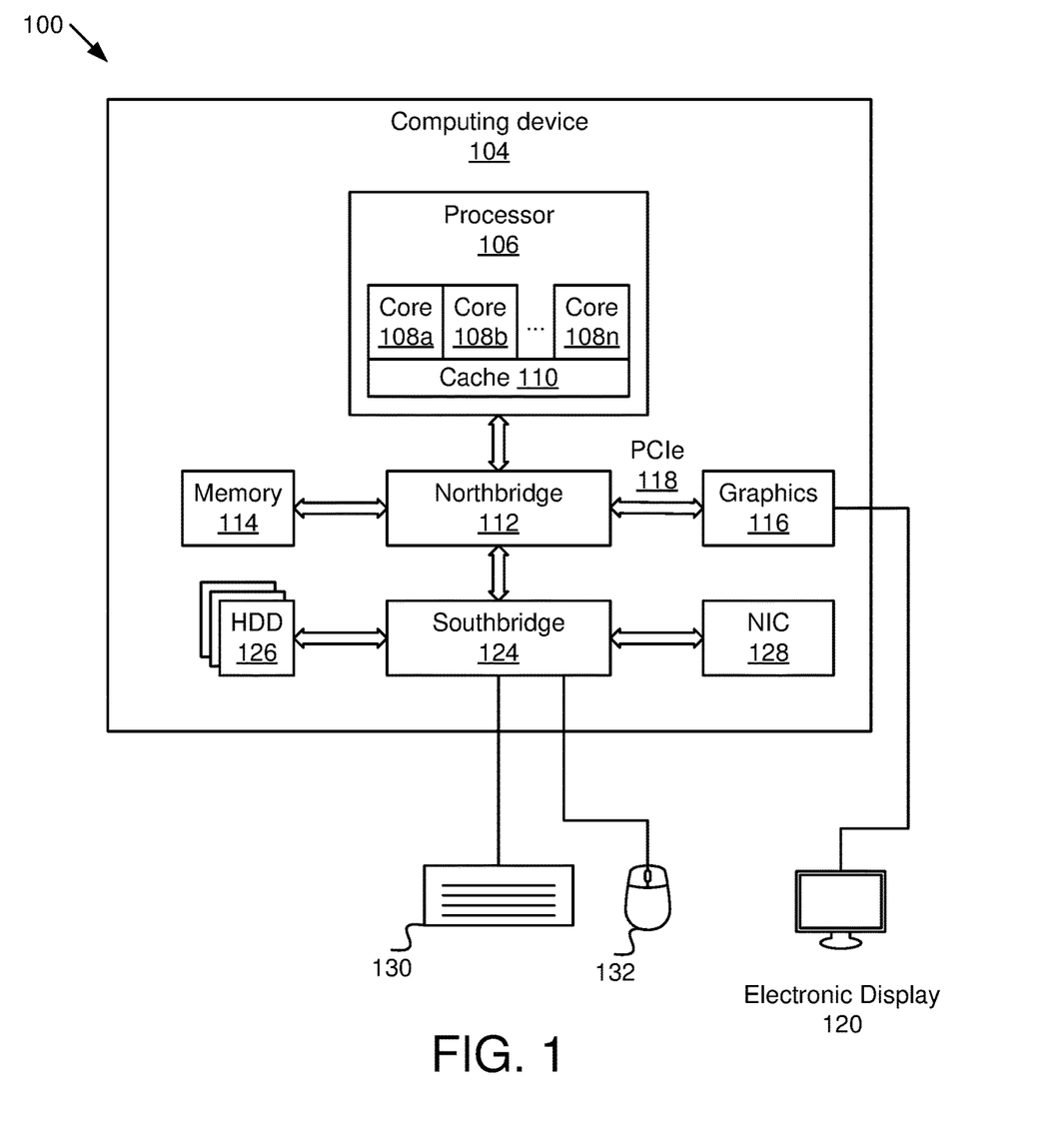
FIG. 1 is a schematic block diagram illustrating one embodiment of a system for shared compare lanes for dependency wake up in a double issue queue.

FIG. 1 is a schematic block diagram illustrating one embodiment of a system 100 for shared compare lanes for dependency wake up in a pair-based issue queue. A pair-based issue queue may also be called a double issue queue and the terms are used interchangeably herein. The system 100 includes a computing device 104 with a processor 106 with N cores 108a, 108b, . . . 108n and cache 110, a northbridge 112, memory 114, a graphics card 116, connected over a peripheral component interconnect express ("PCIe") bus 118, an electronic display 120, a southbridge 124, hard disk drives 126, a network interface card ("NIC") 128, a keyboard 130, and a mouse 132, which are described below.

The system 100 includes a computing device 104, which may be a desktop computer, a laptop computer, a tablet computer, a workstation, a mainframe computer, a smartphone, a fitness tracking device, a game controller, or other computing device with a processor 106. The computing device 104 includes a processor 106 that includes one or more cores 108a, 108b . . . 108n (collectively or generically "108") and corresponding cache 110. The processor 106, in some embodiments, may be referred to as a central processing unit ("CPU"). In other embodiments, each core 108 may be called a CPU. In some embodiments, the computing device 104 may include a baseboard management controller ("BMC") (not shown) or a similar device to manage each core, virtual machines, loading, and other functions known to those in the art. The computing device 104 may include a northbridge 112 that connects to memory 114 over a memory bus. A graphics card 116 may connect to the northbridge 112 through a PCIe bus 118 and may drive an electronic display 120. The electronic display 120 may be separate or may be integrated with the computing device 104 and may be a touch screen I/O device.

The southbridge 124 is connected to the northbridge 112 and may connect to various devices, such as hard disk drives ("HDD") 126, a network interface card ("NIC") 128, a keyboard 130, a mouse 132, a microphone, a camera, speakers and the like. Note that other non-volatile storage devices may be in or connected to the computing device 104, such as a solid-state drive ("SSD") which may be in addition to or in place of the hard disk drives 126. The keyboard 130, mouse 132, microphone, camera, electronic display 120, stylus (not shown), etc. are typical I/O devices that are capable of receiving input from a user to control the computing device 104. Speakers and electronic display 120 are typical I/O devices that receive signals from the computing device 104 to provide output to a user as feedback for commands and other input from the user input through the keyboard 130, mouse 132, microphone, etc.

In some embodiments, the computing device 104 connects to other devices over a computer network through the network interface card ("NIC") 128. The computer network may be a local area network ("LAN"), a wide area network ("WAN"), the Internet, a wireless network, etc. and may include two or more networks. The computer network includes typical network hardware, such as routers, switches, servers, cabling, and the like.

The wireless network may be a mobile telephone network. The wireless network may also employ a Wi-Fi network based on any one of the Institute of Electrical and Electronics Engineers ("IEEE") 802.11 standards. Alternatively, the wireless network may be a BLUETOOTH® connection or a near-field communication ("NFC") connection. In addition, the wireless network may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless network may employ a ZigBee® connection based on the IEEE 802 standard. In one embodiment, the wireless network employs a Z-Wave® connection as designed by Sigma Designs®. Alternatively, the wireless network may employ an ANT® and/or ANT-F® connection as defined by Dynastream® Innovations Inc. of Cochrane, Canada. The wireless network may be an infrared connection including connections conforming at least to the Infrared Physical Layer Specification ("IrPHY") as defined by the Infrared Data Association® ("IrDA" ®). Alternatively, the wireless network may be a cellular telephone network communication. All standards and/or connection types include the latest version and revision of the standard and/or connection type as of the filing date of this application.

Figure 2:
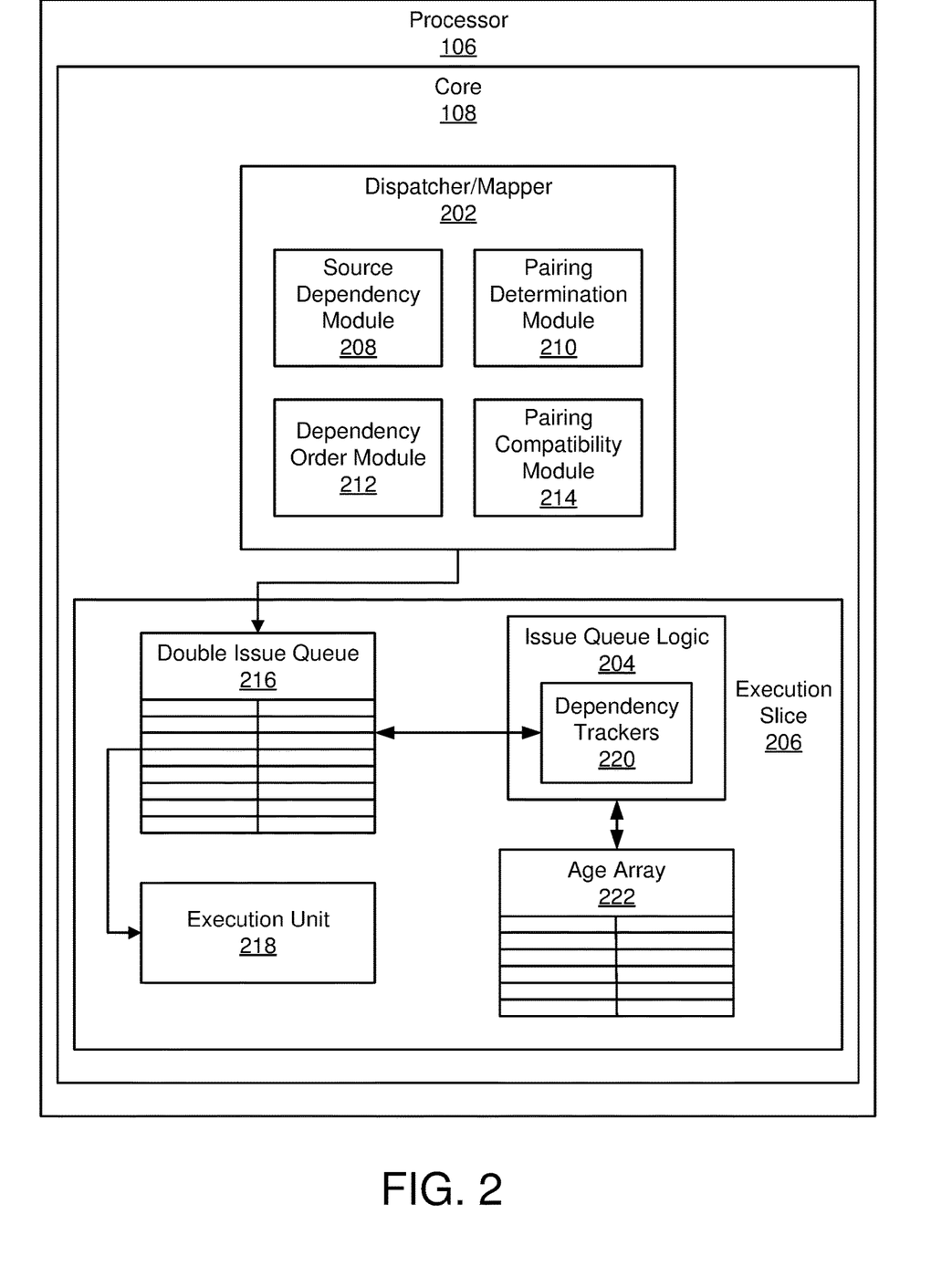
FIG. 2 is a schematic block diagram illustrating one embodiment of an apparatus for shared compare lanes for dependency wake up in a double issue queue.

FIG. 2 is a schematic block diagram illustrating one embodiment of an apparatus for shared compare lanes for dependency wake up in a double issue queue 216. The apparatus includes a dispatcher/mapper 202 and an execution slice 206 of a core 108 of a processor 106 of the computing device 104. The dispatcher/mapper 202 includes a source dependency module 208 and a pairing determination module 210 and may optionally include a dependency order module 212 and/or a pairing compatibility module 214. The execution slice 206 includes issue queue logic 204, a double issue queue 216, an execution unit 218, and an age array 222. The issue queue logic 204 may also include dependency trackers 220.

The dispatcher/mapper 202 determines whether or not to pair two compatible instructions issued from the dispatcher/mapper 202. The dispatcher/mapper 202, in the depicted embodiment, is located in a core 108, but may also be located in the processor 106 and may issue instructions to one or more cores 108. The dispatcher/mapper 202 typically issues instructions for processing by an execution slice 206 of a core 108. The processor 106 may be a multi-slice processor that includes multiple execution slices 206. An execution slice 206, in some embodiments, is a collection of hardware components and circuits configured to support execution of instructions, including elements not shown in FIG. 2, such as general-purpose registers, a history buffer, an arithmetic logic unit (including a vector scalar unit, a floating point unit, and others), etc.

Typically, each core 108 includes more than one execution slice 206. For example, a core 108 may include four execution slices 206. Execution slices 206 are one method of parallel processing of instructions and the dispatcher/mapper 202, in some embodiments, determines which execution slice 206 executes an instruction or a group of instructions. The term 'multi-slice' as used herein refers to a processor 106 having a plurality of similar or identical sets of components, where each set may operate independently of all the other sets or in concert with the one or more of the other sets. Each execution slice 206 may be associated with a single load/store slice to form a single processor slice, and multiple processor slices may be configured to operate together. In other embodiments, a core 108 may not include execution slices 206 and instead the double issue queue 216, execution unit 218, issue queue logic 204, dependency trackers 220, etc. are in the core 108 or in a simpler processor 106 where a processor 106 is not split into cores 108. The dispatcher/mapper 200 is typically two separate devices and is depicted as one device herein for convenience.

The dispatcher of the dispatcher/mapper 202 receives instructions from an instruction cache or other source and dispatches the instructions among execution slices 206. The instructions from the instruction cache may correspond to software written by a user and compiled for the processor 106. An instruction, in some embodiments, is a low-level or assembly-level instruction that may be 32 bits, 64 bits, etc. Other bits may be added to an instruction before processing for tracking, for adding information, for tracking readiness of an instruction, etc. Instructions are executed by various logic hardware to perform various functions, such as addition, subtraction, comparison, and other logical operations. Often, results of a logical operation are stored in one or more registers. An instruction may require results of one or more logical operations prior to execution. For example, an instruction may add two or three numbers where the numbers or operands to be added are the output of logical operations. Thus, an instruction may be dependent on completion of one or more other logical operations.

The dispatcher of the dispatcher/mapper 202 may refer to a dispatch network that includes multiple elements. One such element may perform instruction fusing using the received instructions. A fused instruction is an instruction that has been generated from multiple computer instructions. A fused instruction may be a combination of two instructions in which one instruction is dependent upon the other instruction. Fused instructions may be two instructions placed together to be executed together (e.g., in parallel, during the same cycle). One fused instruction may occupy a half entry or one full entry in a double issue queue 216.

The dispatcher of the dispatcher/mapper 202 may also pair instructions together for execution as paired instructions. Paired instructions are two or more instructions that may be placed in the same entry in the double issue queue 216. Paired instructions may also be executed in parallel (e.g., together during the same cycle). Instructions may be paired if executing both instructions would consume less than a maximum available number of execution unit resources. For example, two instructions may be paired if the total operands between the two instructions is less than (or equal to) the number of available read ports. Paired instruction may, if necessary, be dispatched and issued separately.

In one embodiment, the mapper of the dispatcher/mapper 202 is located in an execution slice 206. In other embodiments, the mapper is located in a core 108 or in the processor 106 along with the dispatcher of the dispatcher/mapper 202. The mapper of the dispatcher/mapper 202 tracks the instructions as the instructions move through the execution slice 206. The mapper may read the source and destination of each instruction and determine the location of the source and destination in a data register file.

The mapper determines source dependencies. For example, for an add instruction with three operands, the mapper may determine that one source is ready at the time the mapper is evaluating instructions for dependencies. A source, as used herein is a logical operation that results in data being stored in a register, queue, etc. once an instruction has executed as part of the logical operation where data resulting from the execution is an operand for an instruction being written to the double issue queue 216. A logical operation of adding three numbers requires three sources. If the sources are not ready when the addition instruction send by the dispatcher/mapper 202, each source that is not ready is a dependent source for the addition instruction creating a source dependency. The issue queue logic 204 keeps track of the source dependencies for each instruction issued by the dispatcher/mapper 202 to be able to wait until results from the dependent sources are ready.

The dispatcher/mapper 202 places instructions in a double issue queue 216, which is sized for paired instructions. Pairing two instructions in a double issue queue 216 is more efficient than placing instructions in a typical single issue queue because paired instructions can use same resources and can occupy less space. The double issue queue 216 is an issue queue with entries capable of storing at least two instructions per entry. The double issue queue 216 may be two or more queues with corresponding sub-entries, with each sub-entry in each queue having corresponding sub-entries in each other queue, and with each group of corresponding sub-entries making up one entry in the double issue queue. Each entry in the double issue queue 216 is capable of storing in a row two fused instructions, two paired instructions, or two individual instructions. Individual instructions are non-fused, non-paired instructions placed independently into the double issue queue 216. As used herein, the term "half" refers to a portion or sub-entry of an entry in the double issue queue 216 and does not limit the number of portions or sub-entries in each entry.

In some embodiments, the execution slice includes an age array 222 that tracks an age of each instruction in the double issue queue 216. A row of the age array 222 may be used to age of one instruction, a fused instruction and/or two paired instructions in the double issue queue 216. For example, the age array 222 may include an even age array and an odd age array or may be an array with each row split into two halves and each side of the age array 222 may correspond to each side of the double issue queue 216 and each row of the age array 222 may correspond to each row of the double issue queue 216. The issue queue logic 204 may use information from the age array 222 along with dependency information to determine when to send an instruction to the execution unit 218.

The age, in one embodiment, is a timestamp of when one or two instructions were placed in a row of the double issue queue 216. In other embodiments, two instructions in a row of the double issue queue 216 may have different ages. Other embodiments of the age may include a count from an execution cycle counter or other means of tracking age of an instruction.

The issue queue logic 204 may include one or more dependency trackers 220. Each dependency tracker 220 keeps track of a source dependency. In other embodiments, the dependency trackers 220 are in an execution slice 206 and may not be considered part of the issue queue logic 204. For example, when the dispatcher/mapper 202 determine that an instruction includes one or more operands and data for an operand is not available at the time the instruction is placed in the double issue queue 216, the situation is termed herein a "source dependency" and a dependency tracker 220 monitors the source dependency by monitoring a dependent source to determine when data from the dependent source is available. Typically, for an instruction each source dependency is assigned a dependency tracker 220. The number of possible source dependencies for an instruction typically depends on the architecture and/or operating system of the computing device 104. For example, the PowerPC™ architecture has up to three operands per instruction with a potential of three source dependencies for an instruction mapped to an issue queue. Other architectures may have more or less operands, and thus more or less potential source dependencies.

The dependency trackers 220, in some embodiments, work in conjunction with dependency information in the double issue queue 216. A row of the double issue queue 216 may be used to track source dependencies of one instruction, a fused instruction, two fused instructions and/or two paired instructions in the row of the double issue queue 216. A row of the double issue queue 216 may include source dependency information, an identifier for the row of the double issue queue 216, valid bits, etc. along with one or two corresponding instructions. For example, a row of the double issue queue 216 may include source dependency information for each available dependency tracker 220. Bits allocated for tracking a source dependency may be called a dependency lane. Not all dependency lanes and/or dependency trackers 220 may be used for every instruction. One or more dependency lanes/dependency trackers 220 may be unused for an instruction.

The dependency information may include an address or pointer information for a data register file where the source information of a source dependency is stored after completion of a logical operation of the dependent source. The source dependency information may also include a wake bit where the wake bit is changed in response to the corresponding dependency tracker 220 determining that data from tracked dependent source is available. For example, the dependency tracker 220 may set the wake bit when the dependent source data is available.

In some instances, an instruction may include less operands than available dependency trackers 220. In other instances, some of the operands of an instruction may be available when the instruction(s) are placed in the double issue queue 216. A wake bit or other bit for a dependency lane may be used to signal the issue queue logic 204 and/or dependency tracker 220 that a source is available at the time the instruction is posted to the double issue queue 216 or that the instruction requires less operands than the total number of dependency trackers 220. For example, an add operation may require two operands while a total of three operands may be used so one operand is unused. The wake bit may be used to signal the issue queue logic 204 to ignore a dependency lane associated with an unused operand or a source that is available when the instruction is posted to the double issue queue 216. The wake bit may also be used to disable the dependency tracker 220 corresponding to the unused dependency lane. In other embodiments, the issue queue logic 204 may set a wake bit of an unused dependency lane. One of skill in the art will recognize other information to be tracked in the double issue queue 216 and other formatting options for bits in the double issue queue 216.

In some embodiments, the double issue queue 216 may include two non-paired instructions in a single row. However, such an arrangement would require a number of dependency trackers 220 equal to twice the maximum number of potential source dependencies for a single instruction. For example, where there are three possible source dependencies for a single instruction, a double issue queue 216 with two non-paired instructions would require six dependency trackers 220. Dependency trackers 220 and associated components and logic are relatively expensive. Having the maximum number of dependency trackers 220 provides optimum performance, but in some situations, is more than would be required for most situations.

As a performance tradeoff, less dependency trackers 220 may be used where logic ensures that there are no more source dependencies than the available dependency trackers 220. For example, when a total number of source dependencies for two paired instructions is six, a majority of paired instructions may use only three dependent sources and the remaining three may go unused most of the time. Other instances may allow a source dependency maximum of four source dependencies for six possible sources. Analysis may reveal an optimal source dependency maximum. An optimal design that balances component cost against performance may be selected by analyzing the number of source dependencies for paired instructions.

In one embodiment, the dispatcher/mapper 202 includes a source dependency module 208 that determines a number of source dependencies for two instructions intended to be paired in a row of a double issue queue 216 of a processor 106. A source dependency includes an unavailable status of a dependent source for data required by the two instructions where the data is produced by another instruction. In the embodiment, the dispatcher/mapper 202 includes a pairing determination module 210 that writes each of the two instructions into a separate row of the double issue queue in response to the source dependency module 208 determining that the number of source dependencies is greater than a source dependency maximum and that pairs the two instructions in one row of the double issue queue 216 in response to the source dependency module 208 determining that the number of source dependencies is less than or equal to the source dependency maximum. In one embodiment, the source dependency module 208 and the pairing determination module 210 are located in the mapper.

Splitting instructions meant to be paired into two separate instructions, each in a separate row of the double issue queue 216, is less efficient than paired instructions, but a cost savings associated with less dependency trackers 220 may be an acceptable alternative. In some embodiments, the source dependency maximum is equal to a number of dependency trackers 220 available to the double issue queue 216, where the dependency trackers 220 each track a source dependency of paired instructions in a row in the double issue queue 216.

In some embodiments, the source dependency maximum is equal to or greater than a maximum number of source dependencies of an unpaired instruction and less than twice the maximum number of source dependencies of an unpaired instruction. For example, the maximum number of source dependencies for a single instruction may be three. Therefore, the maximum number of source dependencies for two paired instructions is then six. The source dependency maximum may be between three and six.

For example, the source dependency maximum may be set to three. In the example, when the source dependency module 208 determines that there are four, five or six source dependencies for two paired instructions, the pairing determination module 210 may then split the instructions into two rows of the double issue queue 216. If there are one, two or three source dependencies, the pairing determination module 210 pairs the instructions in a row of the double issue queue 216. The issue queue logic 204 includes a number of dependency trackers 220 equal to the source dependency maximum. Each dependency tracker determines when data is available from a dependent source. In the embodiment, the issue queue logic 204 includes three dependency trackers 220, thus avoiding the expense of three additional dependency trackers 220 and associated logic. Analysis may determine that the optimal source dependency maximum for a processor 106 may be three, four or five in the example. The source dependency maximum is not less than the maximum number of possible source dependencies for a single instruction or some single instructions may not function properly.

In some embodiments, a dependency tracker 220 includes a comparator that compares a dependent source tag with a result data tag. The dependent source tag is generated in response to the dispatcher/mapper 202 determining that a source dependency exists for the dependent source. A result data tag is a tag paired with data placed in the data register file when an operation of the dependent source is completed. For example, the mapper may pass a tag of a source dependency of a dependent source to a dependency tracker 220. The dependency tracker 220 may then compare the tag of the source dependency with tags of data placed in the data register file. When the dependency tracker 220 matches the source dependency tag with a tag of data in the data register file, the dependency tracker 220 changes the wake bit (for example, sets the wake bit) of the dependency lane in the row of the double issue queue 216 of the applicable instruction to indicate that the dependent source data is ready.

In some embodiments, the dispatcher/mapper 202 includes a dependency order module 212 that orders dependency tracking data corresponding to dependent sources in locations in a row of the double issue queue 216 in response to the pairing determination module 210 paring the two instructions in the row of the double issue queue 216. The double issue queue 216, in some embodiments, includes dependency information of each entry in the double issue queue 216. For example, the dependency order module 212 may order dependency tracking data into dependency lanes of a row of the double issue queue 216 corresponding to dependency trackers 220 and may order operands of sources that are available into other lanes of the double issue queue 216. In some embodiments, the dependency order module 212 is in the mapper. The dependency order module 212 is described in more detail with respect to FIG. 3.

In some embodiments, the dispatcher/mapper 202 includes a pairing compatibility module 214 that determines pairing compatibility of the two instructions prior to the pairing determination module 210 pairing the two instructions. For example, the pairing compatibility module 214 may be in the dispatcher. In the embodiment the pairing compatibility module 214 determines pairing compatibility based on criteria other than a number of source dependencies. For example, the pairing compatibility module 214 may determine that two instructions should be paired based on an order of operations of the instructions where the instructions operate efficiently when paired. In another example, the pairing compatibility module 214 may determine that two instructions should be paired in response to the dispatcher fusing the instructions together. In another example, the pairing compatibility module 214 may determine that two instructions should be paired because the two instructions were issued by the dispatcher one after the other. The source dependency module 208 and pairing determination module 210 may add additional conditions to pairing beyond pairing compatibility determined by the pairing compatibility module 214. The pairing compatibility module 214 may be located in the dispatcher or mapper or other location.

The execution slice 206 includes an execution unit 218 that executes an instruction in the double issue queue in response to the dependency trackers 220 determining that data is available from each dependent source of the instruction and/or an age of the instruction being oldest. For example, an instruction may be oldest in the double issue queue 216 but source dependencies may not be resolved. Once data is available from each dependent source of the instruction, the execution unit 218 may execute the instruction. Alternatively, the dependency trackers 220 may determine that data is available for each dependent source of an instruction, but the instruction may not be oldest in the age array 222. The instruction may be executed immediately or execution by the execution unit 218 may be delayed until the instruction is older or the oldest in the double issue queue 216. The execution unit 218 may execute one instruction in a pair of instructions in a row of the double issue queue 216 when source dependencies for the instruction are resolved while the other instruction is not executed due to unresolved source dependencies.

Figure 3:
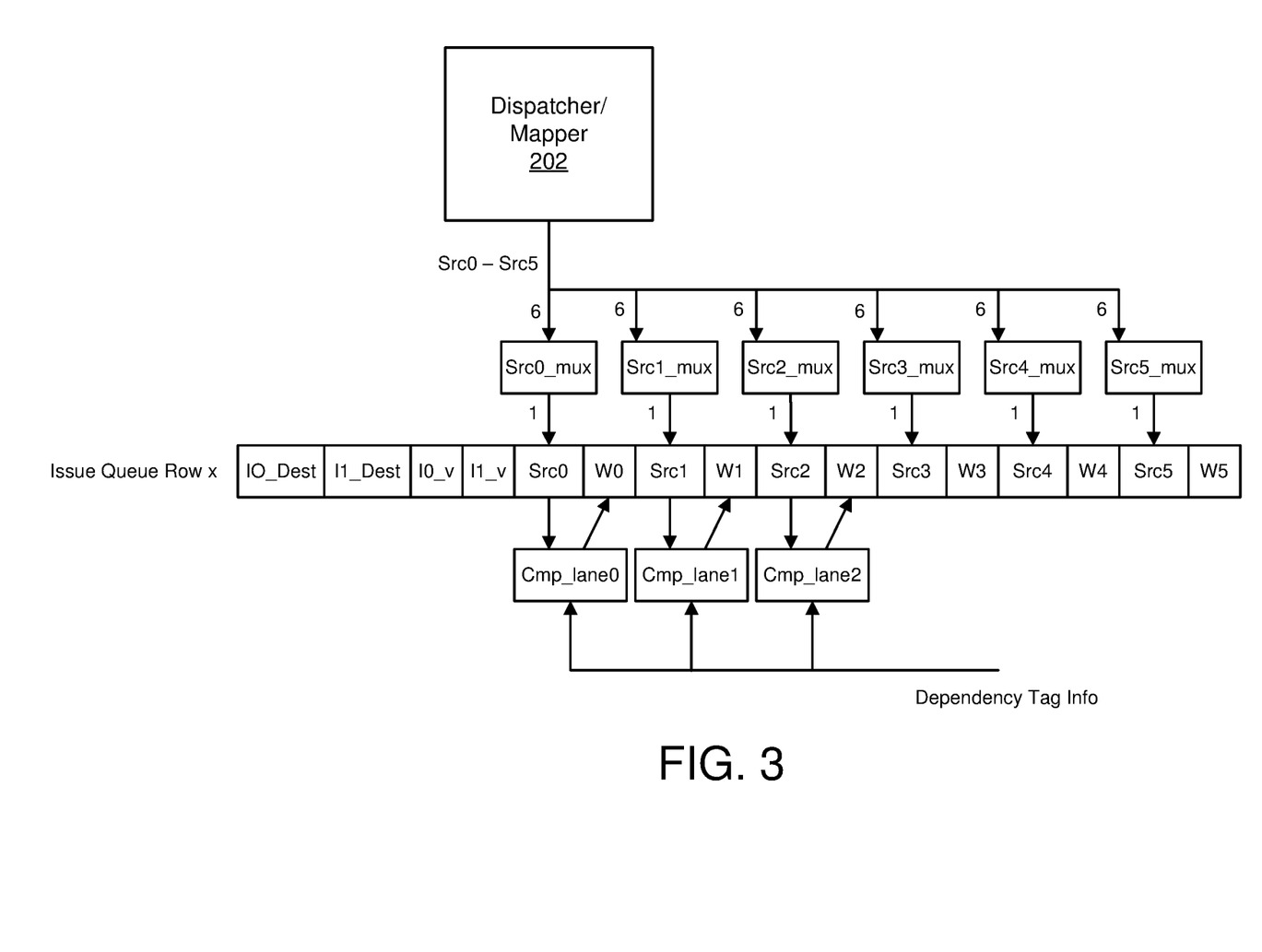
FIG. 3 is a schematic block diagram illustrating an example of a row in the double issue queue of a double issue queue and hardware for dependency wake up.

FIG. 3 is a schematic block diagram illustrating an example of a row in the double issue queue 216 and hardware for dependency wake up. The row x of the age array 222 depicted in FIG. 3 is illustrative and other information may be included. For example, instructions of a row are not depicted but are included in the row. In one embodiment, the age array 222 includes a row for each row of the double issue queue 216 so that location of the row maps to a particular row of the double issue queue 216. In some embodiments, the row x of the double issue queue 216 includes one or more bits that indicate a row number of the double issue queue 216.

The row x of the double issue queue 216, in some embodiments, includes a destination for data from each of the two paired instructions in the double issue queue 216 (e.g. I0_dest, I1_dest). The row x of the double issue queue 216 also includes a valid bit for each instruction location in the corresponding row of the double issue queue 216 (e.g. I0_v, I1_v). In some embodiments, the valid bits I0_v, I1_v indicate whether or not an instruction is stored in each half of the row. For example, when a first valid bit I0_v is set and a second valid bit I1_v is not set, an instruction may be stored in a first half of the row x while the second half of the row x is empty.

The row x of the double issue queue 216 may also include a dependency lane (e.g. Src0-Src2, W0-W2) for each dependency tracker (e.g. Cmp_lane0). Compare lane 0 may include a tag Src0 and wake bit W0 and may have a corresponding tracker Cmp_lane0. The row x of the double issue queue 216 also includes a lane (e.g. Lanes 3-5) for each source with available data (e.g. Src3-Src5, W3-W5). Note that there are no dependency trackers 220 for Lanes 3-5.

The row x includes a tag (e.g. Src0-Src5) that may identify, directly or indirectly, a location of each possible operand in one or more data register files. For example, Src0 may point to a particular location in a data register file so that the corresponding instruction can fetch the data from the data register file upon execution. The tag (e.g. Src0-Src5) may also include a number or other information associated with execution of a particular instruction, which may be appended to location information. One of skill in the art will recognize other forms of a tag. A wake bit (e.g. W0) corresponding to each tag (e.g. Src0) serves to indicate if data from the corresponding dependent source is available.

FIG. 3 depicts six multiplexers ("MUXs") Src0_mux to Src5_mux. Tag information from the dispatcher/mapper 202 for up to six sources are input to each MUX. The dependency order module 212 determines which sources are dependent sources and routes dependent source tags (e.g. Src0_Src2) to the dependency lanes 0-2 with dependency trackers (Cmp_lane0-Cmp_lane2) and routes source tags (e.g. Src3-Src5) to lanes 3-5 without dependencies. The dependency trackers (Cmp_lane0-Cmp_lane2) then compare the dependent source tags Src0-Src2 to dependency tag information from data register files or other locations where data from a dependent source is written. When a dependency tracker (e.g. Cmp_0) determines that the corresponding dependent source tag Src0 matches with a tag from a location where the logical operation of the dependent source wrote data from the logical operation, the dependency tracker Cmp_lane0 changes the corresponding wake bit W0 to indicate that the data from the dependent source is available.

Note that while wake bits W3-W5 are depicted for the lanes 3-5 without a dependency, other embodiments may not include the wake bits W3-W5 for the non-dependent lanes 3-5. In addition, other embodiments may include a different bit that is set when an operand is not needed or when a source is available before paired or non-paired instructions are written to the double issue queue 216. In some embodiments, each wake bit W0-W5 is assigned to an instruction and when the wake bits are set for an instruction, the execution unit 218 may execute the instruction. Where instructions are paired in the row x, one instruction may be executed when the wake bits (e.g. W0, W3, W4) while the other instruction may not have assigned wake bits (W1, W2, W5) set and may not be executed. One of skill in the art will recognize other information included in a row of the double issue queue 216.

Figure 4:
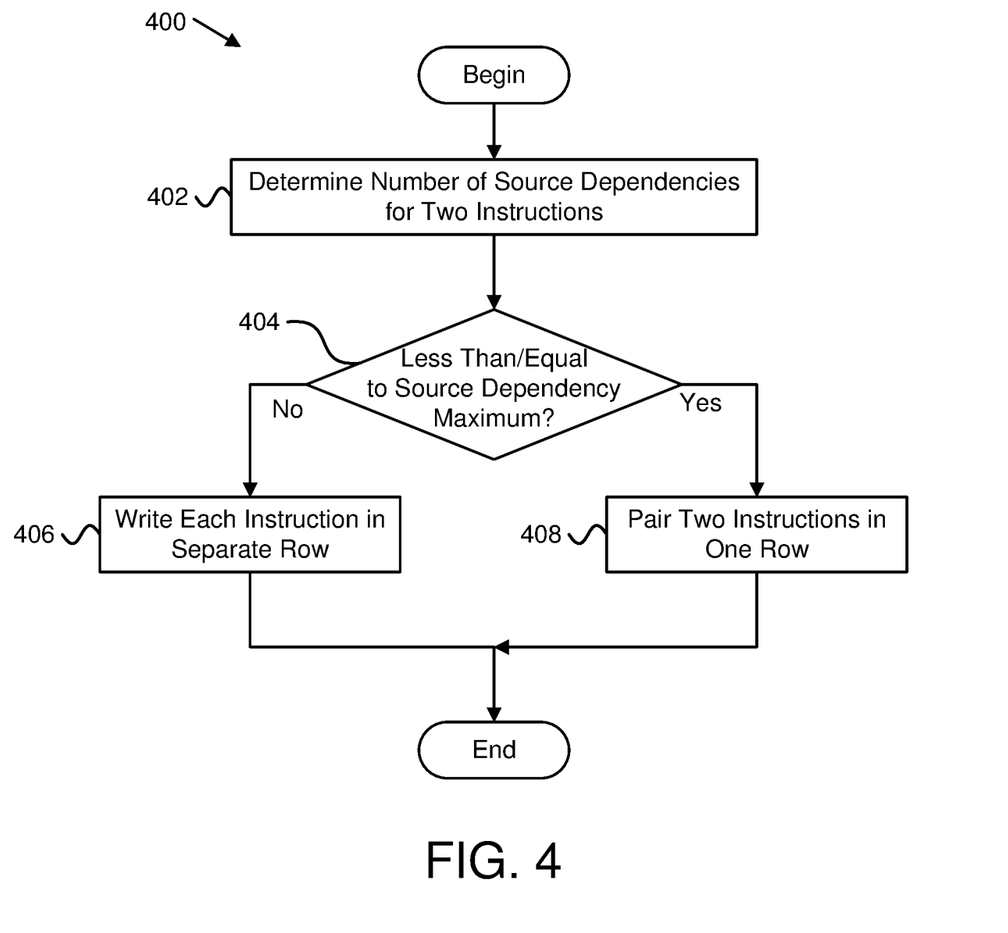
FIG. 4 is a schematic flow chart diagram illustrating one embodiment of a method for shared compare lanes for dependency wake up in a double issue queue.

FIG. 4 is a schematic flow chart diagram illustrating one embodiment of a method 400 for shared compare lanes for dependency wake up in a double issue queue 216. The method 400 begins and determines 402 a number of source dependencies for two instructions intended to be paired in a row of a double issue queue 216 of a processor 106. A source dependency includes an unavailable status of a dependent source for data required by the two instructions where the data is produced by another instruction. For example, the other instruction may be an instruction executing prior to the paired instructions.

The method 400 determines 404 if the number of source dependencies is less than or equal to a source dependency maximum. If the method 400 determines 404 that the number of source dependencies is not less than or equal to a source dependency maximum, the method 400 writes 406 each of the two instructions into a separate row of the double issue queue 216 and the method 400 ends. If the method 400 determines 404 that the number of source dependencies is less than or equal to a source dependency maximum, the method 400 pairs 408 the two instructions in one row of the double issue queue 216 and the method 400 ends. In various embodiments, the source dependency module 208 and/or the pairing determination module 210 may be used to execute the steps of the method 400.

Figure 5:
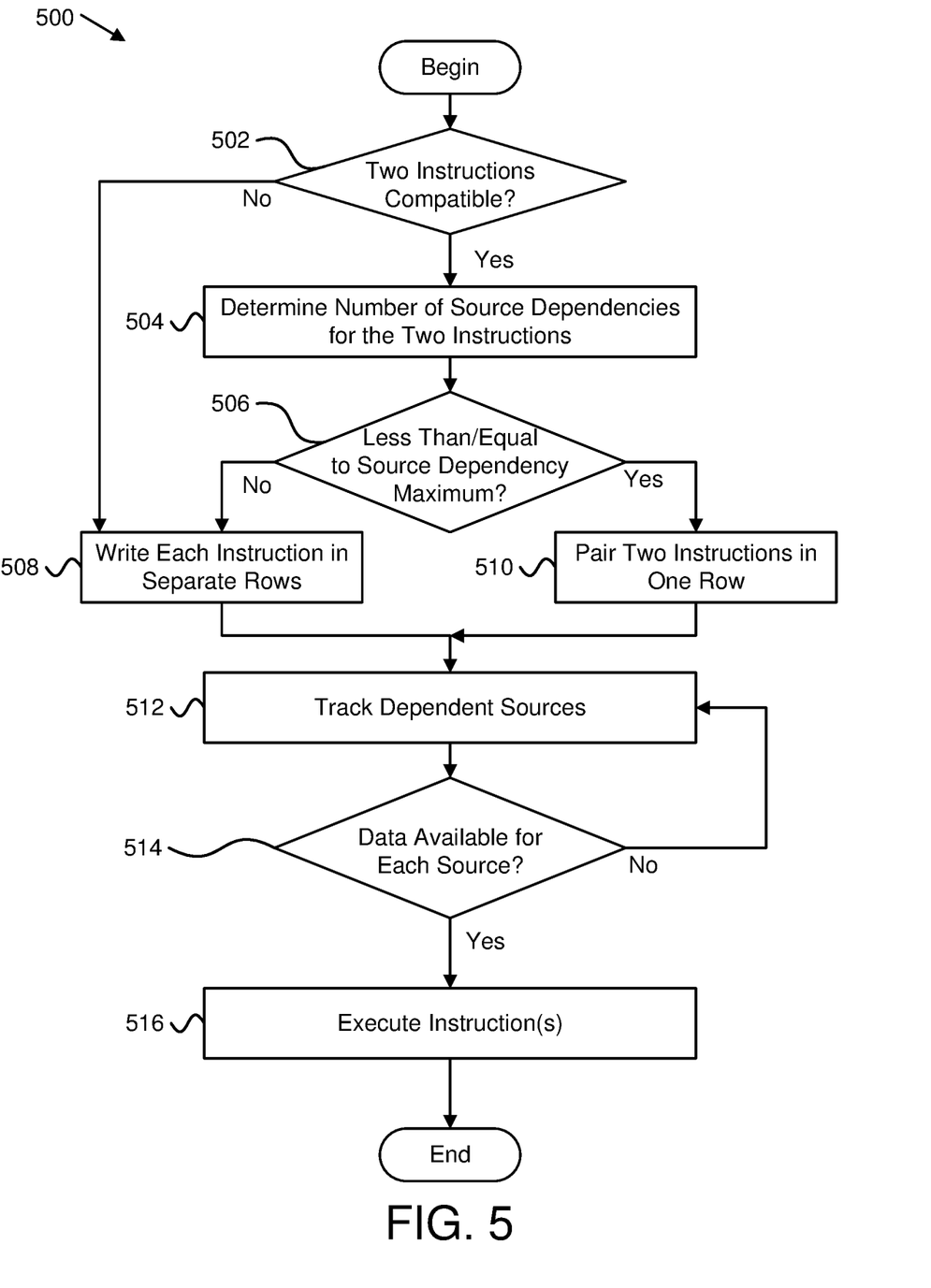
FIG. 5 is a schematic flow chart diagram illustrating another embodiment of a method for shared compare lanes for dependency wake up in a double issue queue.

FIG. 5 is a schematic flow chart diagram illustrating another embodiment of a method 500 for shared compare lanes for dependency wake up in a double issue queue 216. The method 500 begins and determines 502 if two instructions are compatible. If the method 500 determines that the two instructions are compatible, the method 500 determines 504 a number of source dependencies for the two instructions intended to be paired in a row of the double issue queue 216 of a processor 106. A source dependency includes an unavailable status of a dependent source for data required by the two instructions where the data is produced by another instruction.

The method 500 determines 506 if the number of source dependencies is not less than or equal to the source dependency maximum. If the method 500 determines 506 that the number of source dependencies is not less than or equal to the source dependency maximum, the method 500 writes 508 each of the two instructions into a separate row of the double issue queue 216. In addition, if the method 500 determines 502 that the two instructions are not compatible, the method 500 writes 508 each of the two instructions into a separate row of the double issue queue 216. If the method 500 determines 506 that the number of source dependencies is less than or equal to the source dependency maximum, the method 500 pairs 510 the two instructions in one row of the double issue queue 216.

The method 500 tracks 512 the dependent sources and determines 514 if data is available for each dependent source. If the method 500 determines 514 that data is not available for each dependent source, the method 500 returns and determines 514 if data is available for each dependent source. If the method 500 determines 514 that data is available for each dependent source of one or more of the instructions, the method 500 executes 516 the instruction(s) and the method 500 ends. In various embodiments, one or more of the source dependency module 208, the pairing determination module 210, the dependency order module 212, the pairing compatibility module 214 and the dependency trackers 220 execute the steps of the method 500.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
    a source dependency module that determines a number of source dependencies for two instructions intended to be paired in a row of a double issue queue of a processor, a source dependency comprising an unavailable status of a dependent source for data required by the two instructions where the data is produced by another instruction; and
    a pairing determination module that writes each of the two instructions into a separate row of the double issue queue in response to the source dependency module determining that the number of source dependencies is greater than a source dependency maximum and that pairs the two instructions in one row of the double issue queue in response to the source dependency module determining that the number of source dependencies is less than or equal to the source dependency maximum.

2. The apparatus of claim 1, wherein the source dependency maximum is equal to a number of dependency trackers available to the double issue queue, the dependency trackers each tracking a source dependency of paired instructions in a row in the double issue queue.

3. The apparatus of claim 1, further comprising a number of dependency trackers equal to the source dependency maximum, wherein each dependency tracker determines when data is available from a dependent source.

4. The apparatus of claim 3, further comprising a dependency order module that orders dependency tracking data corresponding to dependent sources in locations in a row of the double issue queue in response to the pairing determination module pairing the two instructions in the row of the double issue queue.

5. The apparatus of claim 3, further comprising an execution unit that executes an instruction in the double issue queue in response to the dependency trackers determining that data is available from each dependent source of the instruction.

6. The apparatus of claim 5, wherein each dependency tracker sets a wake bit in the double issue queue in response to determining that data from a dependent source monitored by the dependency tracker is available, wherein the execution unit executes the instruction in response to each wake bit being set of the instruction.

7. The apparatus of claim 3, wherein a dependency tracker comprises a comparator that compares a dependent source tag with a result data tag, wherein the dependent source tag is generated in response to a mapper determining that a source dependency exists for the dependent source and wherein a result data tag comprises a tag paired with data placed in a data register file when an operation of the dependent source is completed.

8. The apparatus of claim 1, wherein the pairing determination module creates a single tag for two instructions paired in the double issue queue and creates a separate tag for each of two instructions placed in separate rows of the double issue queue.

9. The apparatus of claim 1, further comprising a pairing compatibility module that determines pairing compatibility of the two instructions prior to the pairing determination module pairing the two instructions, wherein the pairing compatibility module determines pairing compatibility based on criteria other than a number of source dependencies.

10. The apparatus of claim 1, wherein the source dependency maximum is equal to or greater than a maximum number of source dependencies of an unpaired instruction and less than twice the maximum number of source dependencies of an unpaired instruction.

11. The apparatus of claim 10, wherein the maximum number of source dependencies for an unpaired instruction is three.

12. A computer-implemented method comprising:
    determining a number of source dependencies for two instructions intended to be paired in a row of a double issue queue of a processor, a source dependency comprising an unavailable status of a dependent source for data required by the two instructions where the data is produced by another instruction; and
    writing each of the two instructions into a separate row of the double issue queue in response to determining that the number of source dependencies is greater than a source dependency maximum and pairing the two instructions in one row of the double issue queue in response to determining that the number of source dependencies is less than or equal to the source dependency maximum.

13. The computer-implemented method of claim 12, wherein the source dependency maximum is equal to a number of dependency trackers available to the double issue queue, the dependency trackers each tracking a source dependency of paired instructions in a row in the double issue queue.

14. The computer-implemented method of claim 12, further comprising determining, using a dependency tracker and for each dependent source, when data is available from a dependent source.

15. The computer-implemented method of claim 14, further comprising ordering dependency tracking data corresponding to dependent sources in locations in a row of the double issue queue in response to pairing the two instructions in the row of the double issue queue.

16. The computer-implemented method of claim 14, further comprising executing an instruction in the double issue queue in response to the dependency trackers determining that data is available from each dependent source.

17. The computer-implemented method of claim 12, further comprising creating a single tag for each of two instructions paired in the double issue queue and creating a separate tag for two instructions placed in separate rows of the double issue queue.

18. The computer-implemented method of claim 12, further comprising determining pairing compatibility of the two instructions prior to pairing the two instructions, wherein determining pairing compatibility is based on criteria other than a number of source dependencies.

19. A processor comprising:
    a double issue queue; and
    issue queue logic comprising:
        a source dependency module that determines a number of source dependencies for two instructions intended to be paired in a row of the double issue queue, a source dependency comprising an unavailable status of a dependent source for data required by the two instructions where the data is produced by another instruction; and a pairing determination module that writes each of the two instructions into a separate row of the double issue queue in response to the source dependency module determining that the number of source dependencies is greater than a source dependency maximum and that pairs the two instructions in one row of the double issue queue in response to the source dependency module determining that the number of source dependencies is less than or equal to the source dependency maximum.

20. The processor of claim 19, further comprising:

a number of dependency trackers equal to the source dependency maximum, wherein each dependency tracker determines when data is available from a dependent source;

a dependency order module that orders dependency tracking data corresponding to dependent sources in locations in a row of the double issue queue in response to the pairing determination module pairing the two instructions in the row of the double issue queue; and an execution unit that executes an instruction in the double issue queue in response to the dependency trackers determining that data is available from each dependent source of the instruction.

\* \* \* \* \*